June 27, 1967  W. G. ROWELL  3,327,761
FUEL SAFETY SHUT-OFF APPARATUS
Filed Oct. 19, 1964  2 Sheets-Sheet 1

INVENTOR.
WILLIAM G. ROWELL
BY
*Weingarten, Orenbuch & Lakine*
ATTORNEY

United States Patent Office 3,327,761
Patented June 27, 1967

3,327,761
FUEL SAFETY SHUT-OFF APPARATUS
William G. Rowell, Milton, Mass., assignor to Technical Marketing Associates, Inc., Concord, Mass., a corporation of Massachusetts
Filed Oct. 19, 1964, Ser. No. 404,708
6 Claims. (Cl. 158—42.1)

The present invention relates in general to a fuel safety shut-off apparatus and more particularly concerns novel, compact and relatively low cost apparatus responsive to internal boiler pressure for reliably shutting off the flow of fuel to the boiler.

Within the broad subject classification of fuel shut-off apparatus virtually innumerable mechanical, electromagnetic, and electronic devices have been described in the literature and a comparatively large number of specific types are commercially available at the present time. Perhaps the most successful of the prior types is a mechanical pressure sensitive relief valve that may be mounted directly on a heated container having a vaporizable medium therein such as a steam boiler heated by a burner and in direct communication with the interior of the boiler. This pressure sensitive valve acts when the internal pressure of the boiler exceeds a predetermined unsafe pressure to discharge this unsafe boiler pressure to atmosphere. This device has a number of severe limitations. For example, since it is a normally closed valve responsive to pressure the valve seat may become corroded or encrusted with foreign matter and fail to open at the desired pressure level or it may open initially and then become plugged or partially plugged with boiler scale or other foreign substance being expelled. Any of these events will result in an unsafe failure of the valve. If such a device fails in an unsafe position and if the other safety devices provided on the boiler also fail, a catastrophic boiler explosion with attendant loss of life and economic damage may occur.

Recent innovations have resulted in electrical systems designed to monitor the presence of combustion within the chamber so arranged as to energize and hold an electrically operated solenoid fuel valve open during the wanted periods of combustion and to de-energize the solenoid fuel valve upon unwanted periods of combustion or unintentional loss of combustion and in electrical safety systems to supervise flow, temperature pressure, etc. in the heating system and arranged to de-energize the electrically operated fuel valve upon the detection of an unwanted or unsafe condition. These electrical control systems also have the disadvantages of the mechanical pressure relief valves encountered above. For example, the electrically controlled solenoid fuel valve is subject to catastrophic types of failures since the fuel products supplied to the burner whether in gaseous or liquid form contain certain contaminants which are deleterious and can form on the valve mechanism itself and accordingly prevent its closing properly. Thus, valve stem coatings or warping can occur to circumvent proper operation of the valve, in addition to other mechanical failures that can occur in the valve seat itself.

Additionally, other means of failure on the electrical system can also occur. For example, a recent boiler explosion, in which heavy loss of life and economic damage resulted, occurred due to failure of the electrical fuel valve to be de-energized because of a false ground when the circuit responded in the manner to which it was designed.

Such monitoring systems described, both electrical and mechanical, have almost a predictable life expectancy, and may not fail in a safe manner. The present invention is primarily concerned with the eventual failure of such prior art devices, especially when such failure is of the unsafe variety and particularly avoids certain defects in prior art devices safety systems of the type described.

Such unsafe failures of a safety device can result in the explosively violent and damaging potential of a runaway boiler-burner combination as is only too well known resulting in heavy loss of life and high economic losses as well as other incidental hazards. The present device provides a unit which, if it fails, fails in a safe manner such that it stops the burner. If the device fails, the burner is unnecessarily stopped. However, while this may be classified as a nuisance shut-down, it is nevertheless a safe failure. An unsafe failure in a safety device would mean that it has failed in such a way that it is no longer capable of performing its required safety function and would thereby permit uncontrollable operation of the burner. This, of course, can lead to the catastrophic situation previously described. If a device can fail, then, for safety sake, it must be assumed that it will fail eventually. Accordingly, the present invention is designed to provide a fail-safe pressure relief method and means whereby a new degree of safety is provided in a heating system utilizing a boiler-burner combination.

It is an additional object to provide a fail-safe arrangement to control the unwanted flow of fuel to the burner, and to reduce the number of potentially unsafe failures to a minimum.

Broadly speaking, the present invention accomplishes these and other objects by approximating a closed loop system, whereby a break in any specified link in the chain will produce an action to initiate closing the fuel valve by thereby removing the restraint holding the fuel valve open. In addition, the moveable element of the invention exposed to the internal pressure of a boiler, for example, is so arranged that its failure, or rupture, will not contain the boiler pressure, but will permit its escape to atmosphere, after blowing off the latching mechanism. Such a fail-safe feature would then provide an indication of its failure either by the sound of the escaping pressure, or failure of the boiler to normally build up, or maintain, its usual pressure or, finally, shutting off the fuel to the burner when the latching element is blown off.

It is still an additional object to provide an inexpensive and reliable means to prevent uncontrolled flow of fuel to the burner upon occurrence of a predetermined dangerously high pressure in the boiler.

It is still another object to provide safety means that are adapted to coact with existing temperature-sensitive fuel control valves, in retrofit sense, thereby not necessitating the discarding of such valves in all cases.

It is also an important object to provide a non-electrical pressure-sensitive means in controlling relationship with the fuel supply line to a burner.

Still another very important object of the invention is to provide a mechanical safety control for the heating system, in addition to the prior art safety devices, that will cut off the supply of fuel to a burner when the boiler safety-relief valve fails to properly relieve unwanted boiler pressure, or when, for any reason, the internal boiler pressure exceeds a predetermined amount.

These and other objects and novel features, more particularly pointed out in the appended claims, will be more fully understood and appreciated from the following description of a preferred embodiment of the invention, selected for purposes of illustration, in conjunction with the drawing in which:

Figure 1:
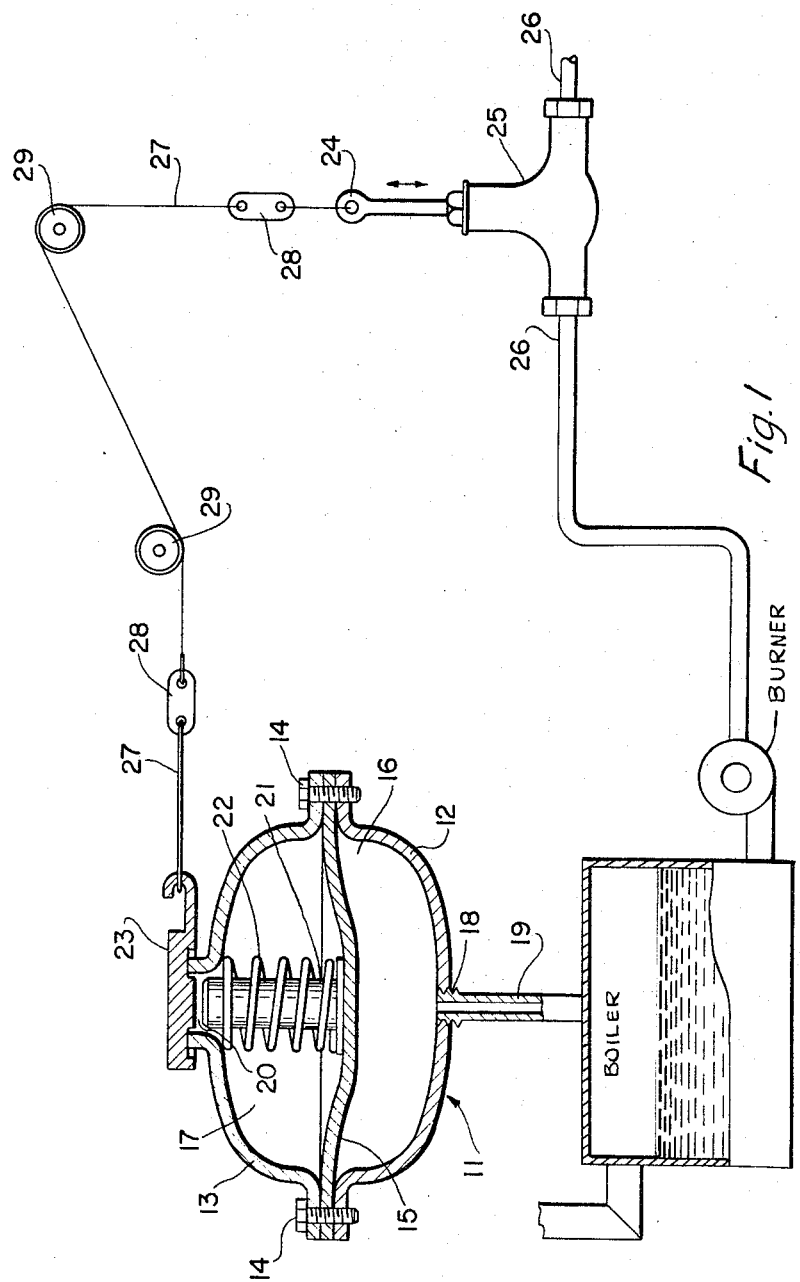
FIG. 1 is a diagrammatic view, illustrating the control apparatus of the invention, combined with a conventional self-closing valve, and particularly showing details of the pressure responsive element of this invention in cross-section.

In reference to the structure shown, it is recognized that construction modifications could well occur to those skilled in the art, and encompass different embodiments from the specific details disclosed herein. For example, the two devices shown in FIG. 1 could readily be combined into a unitary device, with or without the temperature-sensitive means.

The pressure-sensitive control apparatus of the present invention generally comprises a closed casing 11 separable to form two sections 12 and 13. More specifically, the casing 11 is spheroidal and joined at its equator. The sections 12 and 13 may be threaded together or flanged and joined together by any suitable means such as a plurality of bolts 14 mounted around the periphery of casing 11. Securely fastened between the sections 12 and 13 and extending across the equatorial plane of casing 11 is a flexible diaphragm 15. Diaphragm 15 thus separates casing 11 into a lower chamber 16 and an upper chamber 17. The lower chamber 16 is directly connected to the boiler (not shown) of the burner (not shown) by means of a port 18. If desired, the casing 11 can be mounted away from the boiler by threadably mounting a hollow conduit 19, from the boiler, in port 18. The upper chamber is vented directly to the atmosphere by means of a centrally located orifice 20. A shaft 21 located in chamber 17 and centrally mounted on diaphragm 15 is displaced directly below orifice 20 and maintained a fixed distance from orifice 20 by a spring 22 located between casing 13 and diaphragm 15. The length of shaft 21 must be sufficient to pass through and out of orifice 20 when the spring 22 is compressed. It should be noted that the diameter of shaft 21 is considerably smaller than orifice 20 and has no surface bearing on orifice 20. Thus, the possibility of binding of shaft 21 in orifice 20 is eliminated. It should further be noted since shaft 21 is not in direct communication with the boiler there is no likelihood that the shaft 21 will become corroded or encrusted with foreign matter such that it will not pass through orifice 20. Since chamber 17 is isolated from chamber 16, there is no likelihood that orifice 20 will become plugged by scale from the boiler.

A plug or cover 23 is removably seated on and across orifice 20 to seal the orifice 20 in such a manner that, when the pressure in lower chamber 16 exceeds a value sufficient to overcome spring 22, the diaphragm will be pressed upwards causing the shaft 21 to enter orifice 20 and push the cap 23 off the orifice 20. The cover 23 may also be removed by pressure alone in the case where the diaphragm ruptures.

The cover 23 is connected to a stem 24 of a normally open, spring-actuated, self-closing valve 25 mounted in the fuel line 26 by means of a flexible linkage 27. The linkage 27 may have one or more temperature actuated fusible links 28 therein and may extend over tensioning or supporting means such as pulleys 29 and must be of sufficient length to hold valve 25 in a normally open position when cover 23 is located over orifice 20.

The operation of the invention is as follows: when the burner is in operation and heating a chamber, such as a steam boiler, fuel is supplied to the burner through fuel line 26. Upon the occurrence of an excess predetermined pressure in the boiler to be protected, the excess pressure will cause the diaphragm 15 to overcome the bias of spring 22 and move upwardly. This, in turn, will cause the shaft 21 to push the cover 23 away from orifice 20 in housing 13. The cover 23, upon being flipped off, will release the restraint on the valve stem 24 of the fuel valve 25. As this valve stem 24 is spring tensioned to close the valve 25, the valve 25 will close and thereby stop the flow of fuel to the burner.

Thus, if the pressure in the lower chamber momentarily exceeds an unsafe level the mechanism will react by shutting off the fuel to the burner. This, in turn, will prevent further pressure from being built up in the chamber protected by the device of the invention.

One or more fusible links 28, for example, could well be placed in the vicinity of the burner, and one or more could well be placed in the vicinity of the fuel supply tank, or fuel entrance into the system. Such fusible links are well known, being used extensively in the art, and are available in predetermined fusing temperature ranges. They are generally arranged with two pieces held together by a fusible solder, so that upon exposure of the solder to a predetermined temperature the solder will fuse and allow the two pieces to come apart and thus permit closure of the self-closing fuel valve.

It can readily be seen from the drawing that a fail-safe system has now being provided by this invention as exemplified by some of the following features:

A. If the connecting means 27 stretches excessively, or breaks, a fail-safe action will occur.

B. If the diaphragm 15 becomes ruptured, the upper chamber 17 and flip-top cover 23 will then be in communication with the boiler pressure. Accordingly, even if the diaphragm is ruptured, when the pressure required to flip the cover 23 off the orifice 20 builds up within the boiler, the cover 23 will be flipped off. Flipping of the cover 23 off the orifice 20 ends the restraining action of the cover 23 on the closure-biased fuel valve 25, thereby causing a shut-off of the burner as a forceful means of bringing to the operator's attention the need for replacement of the ruptured diaphragm.

C. Failure of the biasing spring 22 will not result in an unsafe failure, but instead will cause premature closure of the valve 25 since diaphragm 15 will spring up thereby causing shaft 21 to knock off cover 23.

D. Failure of an electrically controlled fuel valve associated with the burner to properly close can result in a dangerous pressure build up in the heating system. Failure of the boiler safety valve, for any reason, to adequately relieve excess pressure will cause the device of the invention to become actuated.

E. Accidental or other dislodgment of the cover 23 from the upper chamber casing 13 will result in a safe failure since once again valve 25 will close.

F. Ample space is provided around the shaft 21 to thereby prevent an unsafe failure due to formation of foreign matter around the shaft 21, that would otherwise cause the shaft 21 to stick or become unreliable.

Figure 2:
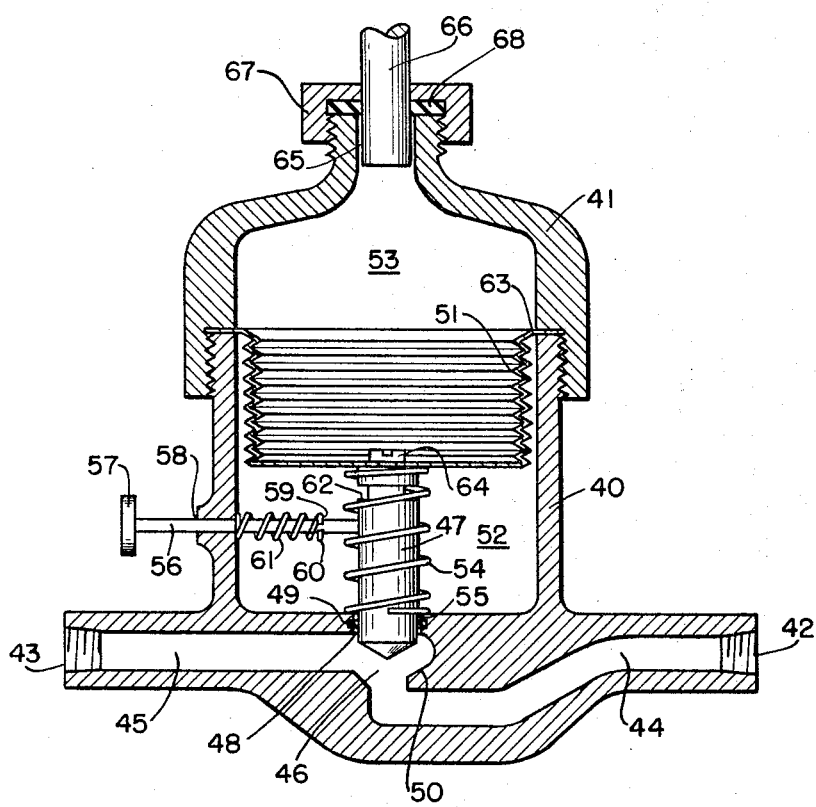
FIG. 2 is a sectional view of a unitary valve incorporating the features of this invention.

FIG. 2 is a sectional view of a fuel line valve incorporating the features of the present invention. Generally the valve comprises a valve body 40 having a removable cap 41, an inlet 42 and an outlet 43. The inlet 42 and the outlet 43 are provided with threaded portions suitable for the connection of the fuel line (not shown) and communicating respectively with passageways 44 and 45. These passageways 44 and 45 are preferably axial and interconnected by a central chamber 46. An opening 48 is provided in chamber 46 through which a slidably mounted valve stem 49 passes into chamber 46. Opposite opening 48 and in line with stem 49 is a valve seat 50 suitable for the abutment of stem 49 to close off the passage of fuel.

The stem 49 carries a bellows 51 which divides the interior of the valve body into a lower chamber 52 and an upper chamber 53. The valve stem 49 is normally maintained in an open position by a yieldable means such as spring 54. When the stem 49 is in this open position, passage of fuel from inlet 42 to outlet 43 is unrestricted. To prevent fuel from entering lower chamber 52 a suitable sealing ring 55 is provided around the stem 47 in opening 48.

Bearing against stem 47 is a stop mechanism which comprises a rod 56 extending laterally through an appropriate opening 58 provided in the wall of housing 40. The rod 56 terminates outside of housing 40 in a handle 57 and is provided inside housing 40 with an annular channel 59 having a split ring 60 inserted therein. A yieldable means, such as spring 61, is placed on the rod 56 under compression between the wall of the housing 40 and the ring 60 so as to force the end of rod 56 against the stem 49. The stem 49 is further provided with an annular channel 62 which is adapted to be engaged by the end of the rod 56 when the stem 49 is seated in valve seat 50.

Returning now to bellows 51, it is seen to comprise a hollow cylinder closed at one end and having a flange 63 at the other. A screw 64 passing through the center of the closed end of the bellows 51 fixedly attaches the bellows 51 to the stem 49. The bellows 51 is secured to the walls of the valve body 40 by inserting flange 63 between the upper end of body 40 and cap 41. The upper surface of cap 41 is provided with a suitable opening 65 through which a high pressure tubing 66 extending from the boiler to be protected passes. To adequately secure tubing 66 to cap 41 a gland nut 67 is threaded onto cap 41. To ensure a pressure type seal, packing 68 is placed around the tubing 66 between the cap 41 and the nut 67.

The operation of this unique fuel safety shut off apparatus is as follows: under normal conditions the spring 54 is urging stem 49 in an upward position so that the central chamber 46 is clear and fuel entering the valve through opening 42 passes along channel 44 through central chamber 46 and along channel 45 to port 43. However, when the pressure in the boiler being protected (not shown) exceeds a predetermined safe level, then the pressure in upper chamber 53 will increase an amount equal to the increase of pressure in the boiler, thereby causing bellows 51 to expand. This expansion of bellows 51 causes the stem 47 to be forced downwardly and seat against valve seat 50 provided in chamber 46 thereby shutting off the flow of fuel through the valve. When the stem 49 is securely seated against the seat 50 then the spring loaded rod 56 of the stop mechanism will be aligned with the annular channel 62 provided in stem 49. When so aligned the end of rod 56 will be snapped into channel 62 under the urging of spring 61. Once the rod 56 is seated in channel 62, the stem 49 will be retained in fixed position against seat 50, thereby giving a positive indication of over pressure and further preventing fuel from being fed to the burner until the trouble causing the over pressure is rectified.

Once the trouble causing the over pressure has been corrected, resetting of the valve to an open position is a simple procedure. All that is required is that the handle 57 be firmly grasped and pulled outwardly so that the rod 56 of the stop mechanism is removed from channel 62. The urging of spring 54 will thus cause the bellows 51 to be compressed and the stem 47 to be retracted from seat 50, thereby allowing fuel once again to flow through the valve.

In the event that the bellows 51 ruptures so that pressure escapes from chamber 53, the stem would still be forced against seat 50. In the event of such a rupture of the bellows, pressure in the system would continue to build up until a sufficient pressure existed in the valve chamber to force stem 47 closed. This closing action occurs because the stem is slidably mounted and is the only element capable of moving under pressure in the valve body.

Many other and additional modifications and adaptations of such a fuel safety apparatus may become apparent to one skilled in the art. For example, the bellows 51 could be eliminated and a suitable piston head provided on the stem 49. Therefore, it should be understood that changes and modifications may be resorted to in keeping with the spirit of this invention and the invention is not to be limited to the particular embodiments or details herein set forth, but limited only by the scope of the appended claims.

What is claimed is:

1. A pressure monitoring system having in combination, a burner adapted to produce a flame, fuel supply means connected to said burner, a closed container containing a vaporizable medium adapted to be heated by said flame, a valve mounted between said fuel supply means and said burner for controlling the supply of fuel to said burner, a pressure responsive means, adapted to be actuated at a predetermined pressure in open communication with the pressure maintained within said container, a cover mounted on the pressure responsive means, a linkage from said cover to said valve restraining said valve in an open position and means within said pressure actuated means for releasing said cover thereby removing the restraint on said valve allowing the valve to be closed.

2. A safety shut-off apparatus involving a valve having a movable stem, means capable of controlling the flow of a fluid through said valve and yieldable means urging said stem toward a position such that flow of the fluid through the valve is restricted, latching means including a cable and a fusible element in said cable, restraining said yieldable means, to hold the valve in a position such that the flow of fluid therethrough is unrestrained and a remotely positioned pressure-actuator device having a diaphragm movable in response to the application of a predetermined pressure, a shaft mounted on said diaphragm, means mounted in said pressure-actuating means urging said diaphragm and said shaft toward an open position and a removable element mounted on said pressure device, said removable element being connected with said latching means and in relation to said shaft whereupon the application of the predetermined pressure to the diaphragm said element is removed releasing said movable stem and allowing the valve to close.

3. A fuel safety shut-off apparatus involving a fuel valve having means therein for restricting the flow of a fuel through said valve and a tensioning device urging said controlling means toward a position such that the flow of the fuel through the valve is restricted, latching means for restraining said tensioning means to hold said controlling means in a position such that the flow of fuel through the valve is unrestrained and a remotely positioned switching device having a first opening and a second opening, said first opening being connected to a pressurized container, a diaphragm separating said first opening from said second opening, a shaft mounted on said diaphragm and aligned with said second opening, tensioning means mounted within said switch urging said diaphragm and said shaft away from said second opening, and a removable element mounted in said second opening and connected to the latching means, said shaft being adapted to remove said element when the pressure sufficient to overcome said tensioning means passes through said first opening.

4. A pressure actuator comprising an upper chamber and a lower chamber separated by a flexible diaphragm, said lower chamber being exposed to a variable pressure, said upper chamber having an opening exposed to atmospheric pressure therein, a shaft mounted on said diaphrgam and positioned so as to enter the opening in said upper chamber, means restraining said shaft from entering said opening, a removable plug mounted in said opening and positioned such that when said shaft enters said opening said plug is removed.

5. A fuel safety shut-off apparatus involving a valve having a movable stem, means capable of controlling the flow of a fluid through the valve and yieldable means urging said stem toward a position such that the flow of the fluid through the valve is restricted, latching means including a cable and a fusible element in said cable for restraining said yieldable means to hold the movable stem in a position such that the flow of fluid therethrough is unrestricted and a remotely positioned pressure actuated device removably fixed to said latching means, said pressure device and said fusible element being activated when unsafe conditions occur.

6. A fuel shut-off apparatus having a fail-safe feature for use with a fuel valve having (a) controlling means for restricting the flow of a fuel through said valve,
(b) biased means urging said controlling means toward a position such that the flow of the fuel through said valve is restricted, and
(c) latching means for restraining said biased means to hold said controlling means in a position such that the flow of fuel through said valve is unrestrained,
comprising
 (1) a remotely positioned vapor-impermeable switching device housing having only a first opening and a second opening therein, said first opening being adapted to communicate outside of said housing device only with the interior of a container,
 (2) a diaphragm within said housing separating said first opening from said second opening,
 (3) a shaft within said housing mounted on said diaphragm for movement therewith and aligned with said second opening,
 (4) tensioning means within said housing urging said diaphragm and said shaft away from said second opening, and
 (5) a removable element associated with said housing and removably closing said second opening, said element being adapted to hold said latching means in a position restraining action of said biased means when said element closes said second opening and to cause said latching means to move to a position permitting said biased means to act when said element is removed;
said diaphragm being adapted to force said shaft to remove said element and thereby restrain said fuel flow after pressure sufficient to overcome said tensioning means passes from the interior of said container, through said first opening and onto said diaphragm; and said housing being adapted to cause the build-up of a predetermined pressure therein to remove said element when said diaphragm is ruptured.

References Cited
UNITED STATES PATENTS

| | | | |
|---|---|---|---|
| 1,278,068 | 9/1918 | Macdonald | 237—8 |
| 1,875,947 | 9/1932 | Stark. | |
| 2,239,774 | 4/1941 | Blanchard | 137—94 |
| 2,252,905 | 8/1941 | Wendland | 137—461 X |
| 2,429,916 | 10/1947 | Belgan. | |
| 2,517,484 | 8/1950 | Henneman | 137—461 X |
| 2,765,802 | 10/1956 | Rowell | 138—42.4 X |
| 2,870,827 | 1/1959 | Brockbank | 158—42.4 |
| 3,143,126 | 8/1964 | Terry | 137—94 |

FREDERICK KETTERER, *Primary Examiner.*